(12) United States Patent
Chatras et al.

(10) Patent No.: US 12,255,791 B2
(45) Date of Patent: Mar. 18, 2025

(54) METHOD AND DEVICE FOR PROCESSING A NETWORK SERVICE INSTANTIATION REQUEST

(71) Applicant: ORANGE, Issy-les-Moulineaux (FR)

(72) Inventors: Bruno Chatras, Chatillon (FR); Philippe Fouquart, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/651,661

(22) PCT Filed: Sep. 13, 2018

(86) PCT No.: PCT/FR2018/052242
§ 371 (c)(1),
(2) Date: Mar. 27, 2020

(87) PCT Pub. No.: WO2019/063907
PCT Pub. Date: Apr. 4, 2019

(65) Prior Publication Data
US 2020/0313981 A1 Oct. 1, 2020

(30) Foreign Application Priority Data
Sep. 29, 2017 (FR) ...................................... 1759054

(51) Int. Cl.
*H04L 41/5041* (2022.01)
*G06F 8/60* (2018.01)
(Continued)

(52) U.S. Cl.
CPC ............ *H04L 41/5041* (2013.01); *G06F 8/60* (2013.01); *G06F 9/455* (2013.01); *H04L 41/5058* (2013.01); *H04L 61/4511* (2022.05)

(58) Field of Classification Search
CPC ............ H04L 41/5041; H04L 41/5058; H04L 61/1511; H04L 41/12; H04L 41/5051;
(Continued)

(56) References Cited

U.S. PATENT DOCUMENTS 10,083,098 B1 * 9/2018 Balmakhtar .......... G06F 11/301
10,148,731 B2 * 12/2018 McDonnell ............. H04L 41/12
(Continued)

FOREIGN PATENT DOCUMENTS

CN 105808316 A * 7/2016 ............. H04L 29/08
CN 105635345 B * 2/2019 .......... H04L 61/1511
(Continued)

OTHER PUBLICATIONS

Triay, J. "Welcome to the World of Standards", ESTI World Class Standards, ETSI NFV Architecture & Interfaces, Presentation at NFV World Congress, 2017 (Year: 2017).*
(Continued)

*Primary Examiner* — Alex H. Tran
(74) *Attorney, Agent, or Firm* — David D. Brush; Westman, Champlin & Koehler, P.A.

(57) ABSTRACT

A method and device for processing a network service instantiation request received by an orchestration entity using a virtualized network function service. A descriptor of the network service includes at least one reference to an object to be deployed in order to instantiate the network service. When the descriptor of the object is not available at the orchestration entity, the orchestration entity obtains information from the network service descriptor that can be used to identify at least one target entity configured to instantiate the object on instruction from the orchestration entity or to transmit the descriptor of the object to the orchestration entity, and transmits, to one of the at least one
(Continued)

target entities, a request to instantiate the object or a request to recover a file comprising the descriptor of the object.

7 Claims, 4 Drawing Sheets

(51) Int. Cl.
*G06F 9/455* (2018.01)
*H04L 41/50* (2022.01)
*H04L 61/4511* (2022.01)

(58) Field of Classification Search
CPC .......... H04L 41/40; H04L 41/0895; H04L 41/342; H04L 41/5048; H04L 41/5045; H04L 41/0846; H04L 67/1095; H04L 67/568; G06F 8/60; G06F 9/455; G06F 8/63; G06F 8/61
See application file for complete search history.

(56) References Cited

U.S. PATENT DOCUMENTS

| | | | | |
|---|---|---|---|---|
| 10,469,317 | B1* | 11/2019 | Jiang | .............. G06F 9/45504 |
| 10,523,529 | B2 | 12/2019 | Yu et al. | |
| 2016/0212016 | A1 | 7/2016 | Vrzic et al. | |
| 2017/0006083 | A1 | 1/2017 | McDonnell | |
| 2017/0012823 | A1* | 1/2017 | Zhu | .............. H04W 28/08 |
| 2017/0141944 | A1* | 5/2017 | Lee | .............. H04L 67/10 |
| 2017/0244596 | A1* | 8/2017 | Chen | .............. H04L 12/1407 |
| 2017/0311244 | A1* | 10/2017 | Kodaypak | .............. H04W 8/14 |
| 2017/0373931 | A1* | 12/2017 | Liu | .............. H04L 41/082 |
| 2018/0004576 | A1* | 1/2018 | Gokurakuji | .............. G06F 9/46 |
| 2018/0191580 | A1 | 7/2018 | Xia et al. | |
| 2018/0309646 | A1* | 10/2018 | Mustafiz | .............. H04L 41/5041 |
| 2018/0316730 | A1* | 11/2018 | Schaefer | .............. H04L 41/0803 |
| 2018/0324261 | A1* | 11/2018 | Yi | .............. H04L 67/16 |
| 2019/0068463 | A1* | 2/2019 | Li | .............. G06F 9/5077 |
| 2019/0149408 | A1* | 5/2019 | Li | .............. H04L 12/4641 709/223 |
| 2019/0356559 | A1* | 11/2019 | Kern | .............. H04L 41/0893 |
| 2020/0133708 | A1* | 4/2020 | Li | .............. H04L 41/0895 |

FOREIGN PATENT DOCUMENTS

| | | | | |
|---|---|---|---|---|
| EP | 3334089 B1 | * | 10/2019 | ......... H04L 41/0876 |
| WO | WO-2016127436 A1 | * | 8/2016 | ........... G06F 16/951 |
| WO | WO-2017035735 A1 | * | 3/2017 | ......... G06F 9/45558 |

OTHER PUBLICATIONS

International Preliminary Report on Patentability and English translation of the Written Opinion of the International Searching Authority dated Mar. 20, 2019 for corresponding International Application No. PCT/FR2018/052242, filed Sep. 13, 2018.

International Search Report and Written Opinion dated Dec. 17, 2018 for corresponding International Application No. PCT/FR2018/052242, filed Sep. 13, 2018.

Delvic Alisa et al., "NESMO: Network Slicing Management and Orchestration Framework", 2017 IEEE International Conference on Communications Workshops (ICC Workshops), IEEE, May 21, 2017 (May 21, 2017), pp. 1202-1208, XP033111657.

ETSI Group Specification "Network Functions Virtualisation (NFV); Management and Orchestration; Or-Vnfm reference point—Interface and Information Model Specification", ETSI GS NVF-IFA 007 V2.1.1 (Oct. 2016), http://www.etsi.org/standards-search, 130 pages.

ETSI Group Specification "Network Functions Virtualisation (NFV); Management and Orchestration; Or-Vnfm reference point—Interface and Information Model Specification", ETSI GS NFV-IFA 013 V2.1.1 (Oct. 2016), http://www.etsi.org/standards-search, 127 pages.

Cheshire S., et al., "DNS-Based Service Discovery" Internet Engineering Task Force (IETF), Standards Track, ISSN: 2070-1721, Feb. 2013, 49 pages.

* cited by examiner

METHOD AND DEVICE FOR PROCESSING A NETWORK SERVICE INSTANTIATION REQUEST

CROSS-REFERENCE TO RELATED APPLICATIONS

This Application is a Section 371 National Stage Application of International Application No. PCT/FR2018/052242, filed Sep. 13, 2018, which is incorporated by reference in its entirety and published as WO 2019/063907 A2 on Apr. 4, 2019, not in English.

1. FIELD OF THE INVENTION

The invention relates to telecommunication networks, and more particularly networks that use a network function virtualisation mechanism.

2. PRIOR ART

Telecommunication networks are formed of multiple pieces of equipment each having a very particular function (routers, switches, servers, etc.). For the most part, these functions are today indissociable from the equipment that hosts them, with the "equipment/function" pair being sold as an integrated product by the equipment manufacturers of the sector.

Network Functions Virtualization (NFV) aims to break this pairing, by applying the principles of cloud computing. Software that implements network functions are then purchased independently by a network operator then installed on unmarked computer servers, grouped into vast pools distributed over a small number of geographical sites.

Figure 1:
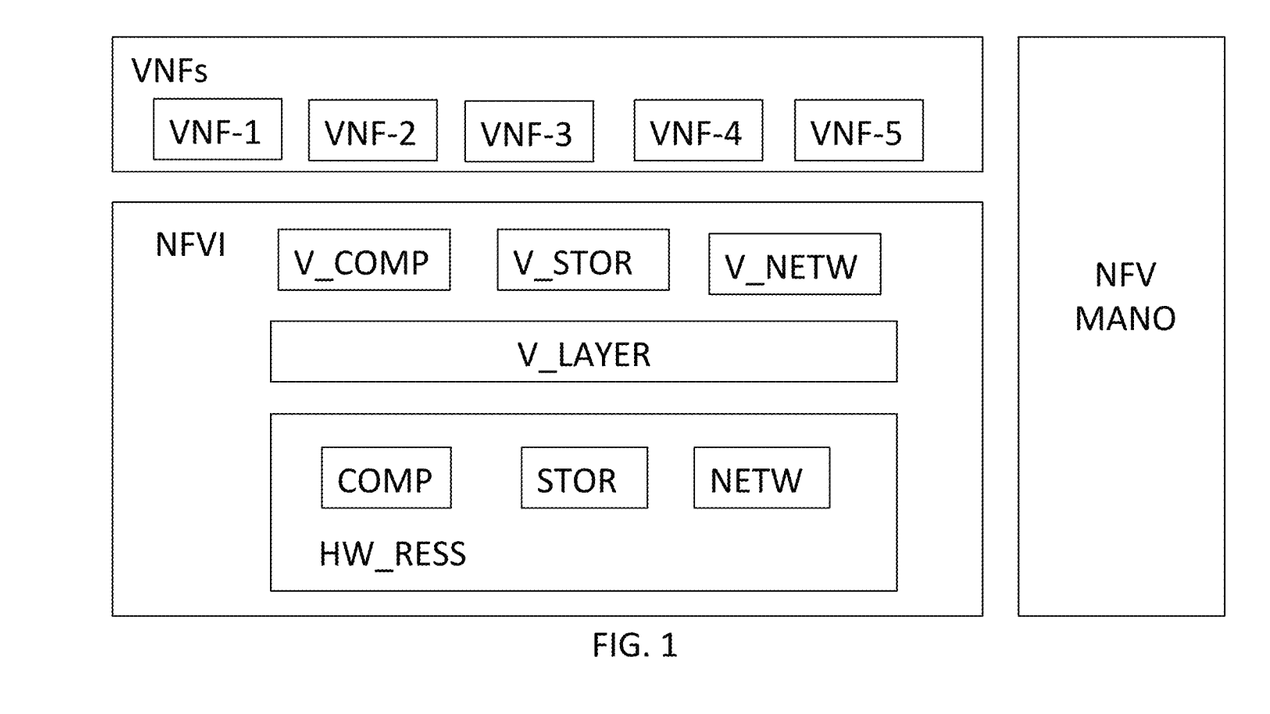
FIG. 1, described hereinabove, shows a network functions virtualisation system NFV.

The reference architectural framework specified by the ETSI (European Telecommunications Standards Institute) identifies three functional blocks that form an NFV system, of which an example is shown in FIG. 1:

Virtual Network Functions (VNF), VNF-1 to VNF-5 in FIG. 1,

The infrastructure (NFVI for Network Functions Virtualization Infrastructure) providing the resources (HW-RESS in FIG. 1) that allow these functions to execute and communicate together The MANO (MANagement and Orchestration) functions which provide the dynamic association of resources with virtualised functions.

The infrastructure is formed of high-capacity server pools, offering resources in computation (COMP in FIG. 1), storage (STOR in FIG. 1) and communication (NETW in FIG. 1). These resources are partitioned by a specific software layer (typically a hypervisor, V_LAYER in FIG. 1), with each partition (for example a virtual machine in the case of a hypervisor) hosting the software of a network function or of a portion of the latter and using virtualised resources (V_COMP, V_STOR, V_NETW in FIG. 1). Virtual machines communicate with one another via virtual networks which themselves are partitions of the physical network of the infrastructure.

The management and orchestration functions are the brain of an NFV system. They handle the life cycle of the virtualized functions, from their instantiation to their deletion, including scale changes. The behaviour of such virtualised functions VNF is controlled by a series of descriptors that contain the characteristics of the network functions to be deployed and the instructions required for the assembly thereof in order to form a coherent network service.

Thus, a network function descriptor (also called VNFD) is a file provided by the vendor of the virtualised function VNF, that makes it possible to determine the resources required to deploy such a virtualised function. For example, the file provides the number of virtual machines required, the type of internal and external connectivity to be used. The file also provides constraints to be complied with in order to deploy the virtualised function, for example: not deploying two components or two instances of the same function on the same physical server for reasons of reliability or on the contrary deploying two components or two instances of the same function on the same physical server for performance reasons.

This virtualised network function descriptor VNFD is included in an archive file called "VNF package" which also contains the software to be installed. This archive file once it is obtained from the VNF supplier is stored at an entity called NFV Orchestrator (NFVO for Network Functions Virtualization Orchestrator). An entity called VNF Manager (VNFM for Virtual Network Functions Manager) can then download such a VNFD descriptor. The NFVO and VNFM entities are pieces of equipment or software modules that provide the management and orchestration functions (MANO) of the NFV system. The entity VNFM's function is to instantiate virtualised network functions VNF, scale or update virtualised network functions VNF, or delete virtualised network functions VNF. Such an entity is in charge of managing the life cycle of virtualised network functions VNF, under the control of the orchestrator NFVO.

In general, a network service requires the instantiation of a set of virtualised network functions (VNF) and/or nested network services (called Nested NS for Nested Network Service). A network service descriptor (NSD) is thus defined. Such a network service descriptor NSD is a file, in general filled by the operator itself, making it possible to describe an assembly of functions that are virtualised or not.

In what follows, the term "object" refers to a virtualised network function (VNF), or a nested network service (Nested NS).

A network service descriptor contains references to the descriptors of the objects to be instantiated in order to instantiate the target network service. These are in particular references of virtualised network functions descriptors (VNFs) and descriptors of other nested network services (Nested NS). The NSD file is typically stored at the NFVO and contains descriptor identifiers VNFD which will be used as a basis to instantiate the required virtualised network functions VNFs.

In the ETSI NFV architecture, the content of a network service descriptor NSD is used by the entity called NFV Orchestrator (NFVO) to instantiate a complete network service. The content of a descriptor VNFD is however used by the entity called VNF Manager (VNFM) to instantiate a virtualised network function VNF on instruction from the entity NFVO.

According to the ETSI specifications, the references included in a network service descriptor NSD make it possible to identify in a unique way an object descriptor but not to determine where this object descriptor is located.

It is assumed indeed that the entity NFVO has all of the information required to instantiate a network service from a given descriptor NSD. In particular, it is assumed that the VNF Packages and the NSD descriptors corresponding to the virtualised network functions VNF or to the nested network services Nested NS to be instantiated are available locally at the entity NFVO onto which the target network service descriptor NSD has been on-boarded. This therefore supposed that these descriptors and packages have been on-boarded beforehand onto the NFVO entity.

Figures 2A, 2B:
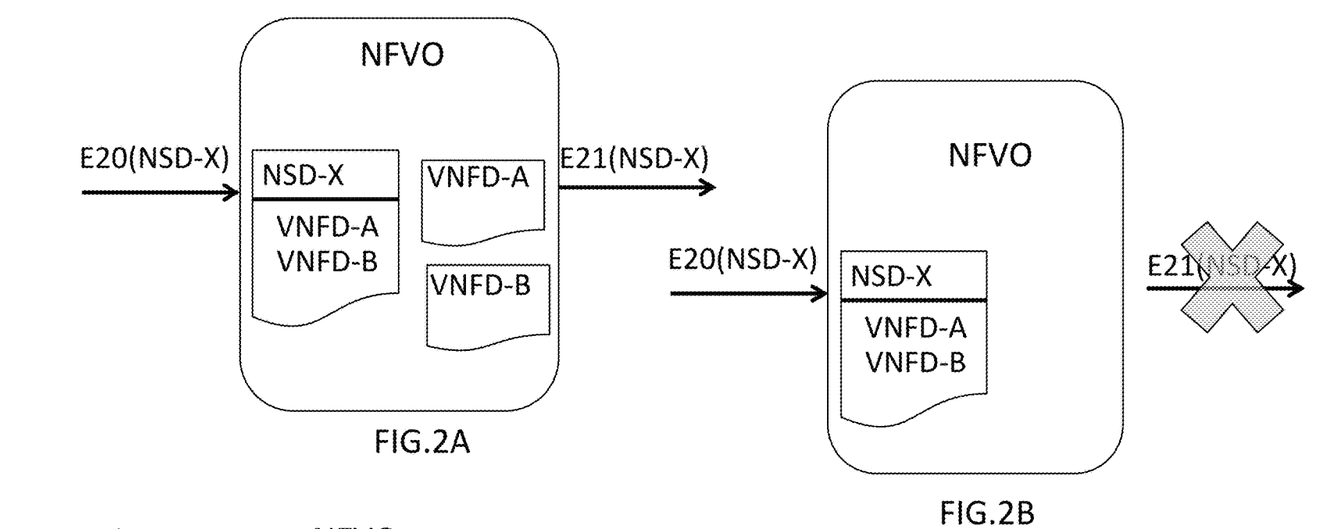
FIGS. 2A and 2B show the processing of a network service instantiation request according to the prior art.

Thus, as shown in FIG. 2A, if a network service descriptor NSD-X references the virtualised network function descriptors VNFD-A and VNFD-B, a network service instantiation request received by the orchestrator NFVO (step E20) based on the descriptor NSD-X can be carried out only if the descriptor NSD-X as well as the packages VNF that contain the descriptors VNFD-A and VNFD-B have been transmitted beforehand to the entity NFVO that receives the network service instantiation request. In this case, the orchestrator NVFO can then process the network service instantiation request (step E21 (NSD-X)).

The availability of the packages VNF that correspond to the descriptors VNFDs referenced by a descriptor NSD is assumed guaranteed by a coordination a priori between entities and actors. The current mechanisms do not make it possible to manage the case where a descriptor VNFD is not available at the entity NFVO.

Thus, as shown in FIG. 2B, when a descriptor VNFD (here VNFD-A and VNFD-B) is not available at the entity NFVO, when a network service instantiation request (E20) corresponding to an NSD descriptor (NSD-X of FIG. 2B) referencing VNFD descriptors (here VNFD-A and VNFD-B in FIG. 2B) unknown to the NFVO entity having received the instantiation request, the network service will therefore not be instantiated and the instantiation request will be rejected.

There is therefore a need to improve the prior art.

3. DISCLOSURE OF THE INVENTION

The invention relates to a method for processing a network service instantiation request received by an orchestration entity using all or a portion of a virtualised network functions service. A network service descriptor comprises at least one reference to an object to be deployed in order to instantiate said network service.

Advantageously, when the descriptor of the object is not available at the orchestration entity, that latter obtains, from the network service descriptor information that can be used to identify at least one target entity configured to instantiate said object on instruction from the orchestration entity or to transmit the descriptor of said object to the orchestration entity. Then, the orchestration entity transmits to one of said at least one target entity an instantiation request of said object or a recovery request of a file comprising said descriptor of said object.

Thus, the entity NFVO is capable of identifying a target entity that can be addressed by the entity NFVO to instantiate the object or to recover the object.

"Object" here means a virtualised network function (VNF) or a nested network service (Nested NS) required for the requested network service instantiation. "Network service instantiation" here means in particular the deployment of the network service, on request from a client for example.

"Client" here means a software module, for example a software module of an API (Application Programming Interface), an application function or a terminal. In the example described here, the client can be a software module of the information system of an operator providing the network service. Such a software module is for example included in a client portal that allows users or another operator to request the deployment of a service, for example a network service.

Advantageously, according to the invention, the syntax of a network service descriptor NSD is modified so as to add information making it possible to access a network service object descriptor to be deployed.

Thanks to the invention, when the orchestration entity NFVO does not have descriptors of the objects required for the deployment of the network service, such descriptors can be obtained from the target entity in such a way that the orchestration entity NFVO instantiates the object itself, or the orchestration entity NFVO sends an instantiation request to the target entity in such a way that the object is instantiated by the target entity.

According to the prior art, when the orchestration entity NFVO does not have descriptors of the objects required for the deployment of the network service, the network service instantiation request is rejected. On the contrary, according to the invention, when the orchestration entity NFVO does not have descriptors of the objects required for the deployment of the network service, the network service instantiation request is processed and the network service requested by the client can be deployed.

The target entity can be a secondary orchestrator, i.e. an orchestrator in charge of instantiating virtualised network functions (VNFs) or nested network services (Nested NS). Such a secondary orchestrator can be an NFVO entity, or a VNFM management entity.

When the orchestration entity NFVO recovers a file that includes the object descriptor, such a file can comprise only the object descriptor or the file can be an archive file (for example a VNF package according to the ETSI terminology) comprising in particular the object descriptor.

Advantageously, according to the invention, the orchestration entity can identify several target entities with which the object descriptor is available. The orchestration entity can then select one of the target entities identified, for example, by considering the load of each one of the target entities and by optimising the distribution of the loads.

According to a particular embodiment of the invention, said information comprises an identifier of the descriptor of the object and an identifier of the target identity on which the descriptor of the object is stored.

According to another particular embodiment of the invention, said information comprises an identifier of the descriptor of the object and an identifier of a virtualised network functions domain on which said target entity is located.

This particular embodiment of the invention procures the advantage that the client requesting the instantiation of the network service does not need to have knowledge of the structure of the domain of the supplier of the network service. The client thus does not need to know the identities of the orchestrators and/or servers for hosting or referencing. The network service instantiation request for the client is thus simpler for the client and the management of a network service descriptor by the supplier is also simplified.

According to an alternative of this particular embodiment of the invention, the method further comprises:
the sending of a query request, by the orchestration entity, to a name server of the virtualised networks functions domain, on a network functions virtualisation service, said virtualised networks functions domain being the domain identified in the network service descriptor,
the receiving of at least one response comprising an identifier of a target entity configured to instantiate said object on instruction from the orchestration entity or to transmit the descriptor of said object to the orchestration entity.

Alternatively, the query request can comprise the identifier of the object descriptor. The invention also relates to an orchestration device configured to use all or a portion of a virtualised network functions service. The orchestration device comprises a receiver of a network service instantiation request, and a memory memorising a descriptor of said network service, said descriptor of the network service comprising at least one reference to an object to be deployed in order to instantiate said network service by an orchestration entity. The orchestration device comprises a processing unit configured to:

when said descriptor of the object is not available at the orchestration entity, obtain, from the network service descriptor, information that can be used to identify at least one target entity configured to instantiate said object on instruction from the orchestration entity or transmit the descriptor of said object to the orchestration entity, and transmit to one of said at least one target entity an instantiation request of said object or a request to recover the descriptor of said object.

The invention also relates to a name resolution server, comprising a memory that memorises at least one record associating an identifier of a virtualised networks functions domain with at least one target entity of the virtualised networks functions domain, said target entity being configured to instantiate an object of a network service on instruction from an orchestration entity or transmit a descriptor of said object to the orchestration entity.

According to a particular embodiment of the invention, said at least one record is of the SRV or PTR type.

Alternatively, said at least one record further comprises a label indicating if said target entity is configured to instantiate said object of the network service or to transmit the descriptor of said object to the orchestration entity.

The invention also relates to a computer program including instructions for implementing the method for processing an instantiation request according to any of the particular embodiments described hereinabove, when said program is executed by a processor. Such a program can use any programming language. It can be downloaded from a communication network and/or recorded on a medium that can be read by a computer. This program can use any programming language, and be in the form of source code, object code, or intermediate code between source code and object code, such as in a partially compiled form, or in any other desirable form.

The invention also relates to a recording medium or information medium that can be read by a computer, and including instructions of a computer program such as mentioned hereinabove. The recording mediums mentioned hereinabove can be any entity or device able to store the program. For example, the medium can include a means of storage, such as a ROM, for example a CD ROM or a microelectronic circuit ROM, or a means of recording (hard drive, USB stick). On the other hand, the recording mediums can correspond to a medium that can be transmitted such as an electrical or optical signal, which can be conveyed via an electrical or optical cable, by radio or by other means. The program according to the invention can be in particular downloaded on a network of the Internet type.

Alternatively, the recording mediums can correspond to an integrated circuit into which the program is incorporated, the circuit being adapted to execute or to be used in the execution of the method in question.

The method for processing an instantiation request according to the invention can therefore be used in various ways, in particular in wired form or in software form.

4. LIST OF FIGURES

Other characteristics and advantages of the invention shall appear more clearly when reading the following description of a particular embodiment, given solely for the purposes of information and in a non-limiting manner, and of the accompanying drawings, among which.

5. DESCRIPTION OF AN EMBODIMENT OF THE INVENTION

5.1 General Principle

The invention aims at modifying the identifiers of VNF functions and of nested network services Nested-NS referenced by a network service descriptor so that, when an orchestrator does not have the required object (VNF, Nested-NS), it can obtain information that allows it to access this object. In other words, the network service descriptor comprises information that allows the orchestrator to identify at least one target entity which is configured to instantiate the required object on instruction from the orchestrator or to transmit to the orchestrator a file that comprises a descriptor of the object. For simplicity, in what follows, such information is called generalised identifier.

In what follows "main orchestrator" refers to an orchestrator in charge of instantiating a first-level network service NS (Network Service), i.e. the network service for which a client sends an instantiation request. "Secondary orchestrator" refers to an orchestrator in charge of instantiating virtualised network functions VNFs or nested network services NS of the second level (Nested NS), i.e. virtualised network functions VNFs or nested network services required for the instantiation of the first-level network service.

According to ETSI NFV terminology, the first-level orchestrator is an NFVO and the second-level orchestrator is another NFVO or a VNFM.

Once the target entity is determined, the main orchestrator, emits to the latter either an object instantiation request, or an object recovery request.

When the main orchestrator emits an object instantiation request, this request applies not only in the case where an NFVO orchestrator specifically instructs a particular VNFM to instantiate a service but also the case where an orchestrator NFVO requests that another NFVO instantiate a nested network service ("Nested NS": a network service of which the life cycle is managed by the second NFVO on behalf of the first).

When the main orchestrator emits a descriptor recovery request, it can obtain either the object descriptor itself, or if it exists an archive file comprising the object descriptor.

These requests (instantiation request, recovery request) can typically be used in the form of APIs REST, such as those specified in documents ETSI GS NFV-IFA007 or 013.

In the first case (instantiation request), the target entity plays the role of a secondary orchestrator.

In the second case (recovery request), the target entity can be a secondary orchestrator or a server for hosting descriptors and/or software archives or a server for referencing objects (VNF or Nested-NS). A referencing server is an intermediary that can in response either provide the identity of a target entity capable of instantiating the object concerned, or provide the archive file of the desired virtualised network function (also called VNF Package in the ETSI specifications), or the archive file of the desired nested network service (also called NS Package). An NS package is an archive file that contains an NSD descriptor of the network service as well as all or a portion of the VNF packages referenced by this NSD descriptor.

When the main orchestrator sends a recovery request for the descriptor of a VNF function or of a nested network service Nested-NS, in order to instantiate itself the function or the nested network service, it then obtains a VNF package of the function or an NS package of the nested network service.

5.2 Examples of Use

Figure 3:
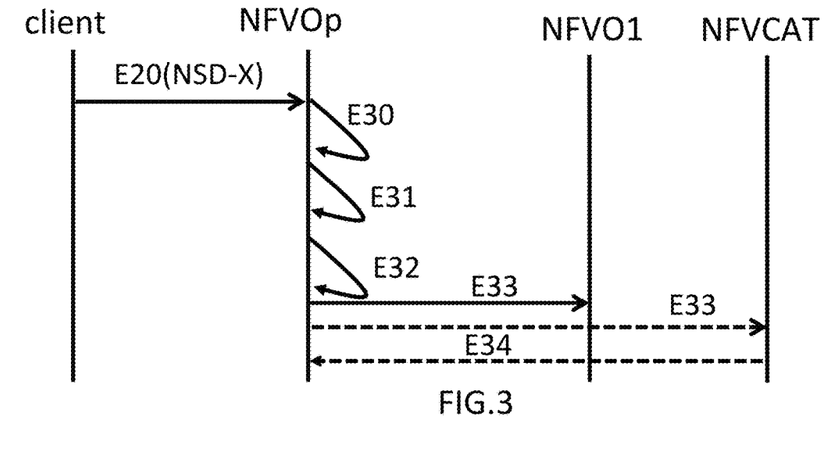
FIG. 3 shows the processing of a network service instantiation request according to a particular embodiment of the invention.

FIG. 3 shows the processing of a network service instantiation request according to a particular embodiment of the invention wherein the generalised identifier comprises an identifier of the descriptor of the object and an identifier of the target entity on which the descriptor of the object is located. These 2 identifiers can be separated or concatenated.

According to FIG. 3, during a step E20, a network service instantiation request is transmitted from a client to an orchestrator NFVOp. Such an instantiation request includes an identifier of the NDS-X descriptor of the requested network service.

During a step E30, the orchestrator reads the NSD-X descriptor of the network service stored in its memory in order to identify the objects required for the instantiation of the requested network service.

For example the NSD-X descriptor comprises two generalised identifiers for one VNFD object descriptor. For example, the network service descriptor comprises the following generalised identifiers in a form in which the two identifiers are concatenated:

---
nfvo1.nfv.orange.com/nsd-123e4567-e89b-12d3-a456-426655440000
nfvcatalogue.orange.com/nsd-123e4567-e89b-12d3-a456-426655440000
---

In this example, the same object descriptor VNFD, identified here by "nsd-123e4567-e89b-12d3-a456-426655440000" is stored in two target entities. By way of example, the two target entities are here respectively another orchestrator NFVO1 identified by "nfvo1.nfv.orange.com" and a file server that is incapable of instantiating a network service NS or a virtualised network function VNF identified by "nfvcatalogue.orange.com".

During step E31, the orchestrator NFVOp detects that it does not have in its memory the VNFD object descriptor "nsd-123e4567-e89b-12d3-a456-426655440000".

During a step E32, the orchestrator NFVOp then obtains the identifier of at least one target entity on which the object descriptor is located by reading in the network service descriptor NSD-X the identifier associated with the identifier of the object descriptor VNFD.

During a step E33, according to an alternative, the orchestrator NVFOp therefore transmits to one of the target entities a VNFD object instantiation request "nsd-123e4567-e89b-12d3-a456-426655440000". According to this alternative, and in the example described here, the orchestrator NFVOp sends its VNFD object instantiation request to the orchestrator NFVO1. According to another alternative, the orchestrator NVFOp instantiates the VNFD object itself. According to this alternative, the orchestrator NVFOp then transmits to the file server identified by "nfvcatalogue.orange.com" (NFVCAT in FIG. 3) a VNF package recovery request including the VNFD object descriptor that it obtains during step E34.

In the case of a multi-domain deployment, this particular embodiment assumes that the client domain has knowledge of the structure of the supplier domain. In other words, the client that sends a network service instantiation request has to have knowledge of the identifiers of the orchestrators and/or of the hosting or referencing servers of the supplier of the network service.

In the case of a multi-domain deployment, the client is a software module that belongs to a domain that is separate from the domain of the supplier.

Other particular embodiments of the invention in which such a knowledge of the structure of the domain of the supplier by the client is not necessary are presented hereinafter in relation with FIGS. 4A and 4B.

According to these other particular embodiments of the invention, the generalised identifier comprises an identifier of the descriptor of the object (for example "nsd-123e4567-e89b-12d3-a456-426655440000" and an identifier of a virtualised networks functions domain NFV on which the target entity is located (for example "orange.com").

According to these other particular embodiments of the invention, in order to access the object descriptor, it is then necessary to obtain the address of the target entity in the domain NFV. For this, the DNS mechanism is used.

The DNS is both an infrastructure and an Internet protocol that is commonly used to associate domain names (exemple.com) with other information: IP address, lists of servers or of services . . . . Different types of records exist, including SRV records (Service Resource Records) or PTR (Pointer Records). Such records are hosted by so-called authoritative servers. The content is described hereinafter of the SRV and PTR records used in particular embodiments of the invention described in relation with FIGS. 4A and 4B.

In these particular embodiments of the invention, steps E20, and E30 to E34 are similar to those described in relation with FIG. 3.

When the orchestrator NFVOp has detected that it does not have in its memory the VNFD object descriptor required for the instantiation of the requested network service, it queries a DNS server of the virtualised networks functions domain NFV of which it obtained the identifier from the network service descriptor NSD-X, in order to obtain the name of a target entity that corresponds to this domain.

Figure 4A:
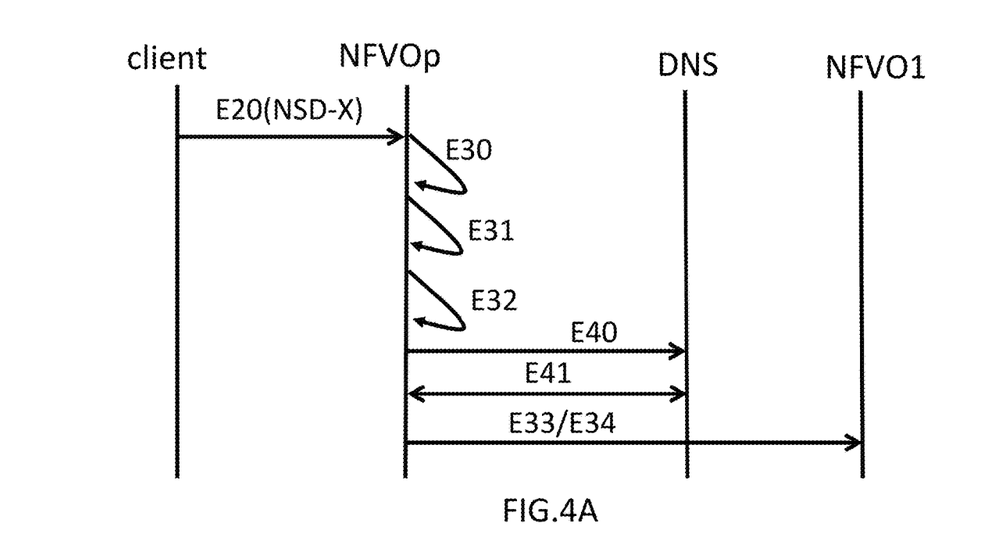
FIGS. 4A and 4B show the processing of a network service instantiation request according to other particular embodiments of the invention.

According to the particular embodiment described in FIG. 4A, during a step E40, the orchestrator NVFOp queries the DNS server of the domain mentioned in the generalised identifier, on the NFV service.

The DNS server comprises SRV records that allow for a simple discovery of a target entity within the identified domain. The DNS server contains for example the following information:

```
$ORIGIN orange.com.
_nfv._tcp.orange.com. 3600 IN SRV 0 0 80 serveur-nfv.orange.com.
$ORIGIN serveur-nfv.orange.com.
serveur-nfv.orange.com. NS serveur-orchestrator-1.orange.com.
```

-continued

```
serveur-nfv.orange.com. NS serveur-orchestrator-2.orange.com.
serveur-orchestrator-1.orange.com.    A    139.100.1.1
serveur-orchestrator-2.orange.com.    A    139.100.10.211
```

According to this example:

"serveur-nfv.orange.com" is a domain name that generically identifies the "NFV domain" of the operator orange.com, "serveur-orchestrator-1.orange.com" and "serveur-orchestrator-2.orange.com" identify servers that store the VNFDs descriptors.

These servers can be physically addressed by one or more IP addresses. To simplify, it has been assumed that a single address (IPv4) was provided for each one of the two names. The mechanism is similar with several addresses or AAAA records (IPv6).

The records described hereinabove are returned to the main orchestrator NFVOp together or sequentially, during a step E41.

For example, in a first step, the main orchestrator NFVOp obtained from the DNS server, the identifier "serveur-nfv.orange.com" from the NFV domain of the domain orange-.com.

Then, the main orchestrator NFVOp again queries the DNS server on the identifier "serveur-nfv.orange.com". The DNS server then sends it the identifiers of the secondary orchestrator servers 1 and 2 "serveur-orchestrator-1.orange-.com" and "serveur-orchestrator-2.orange.com".

The main orchestrator NFVOp then select a target entity from among the two secondary orchestrators, for example the secondary orchestrator 1 "serveur-orchestrator-1.orange-.com".

The main orchestrator NFVOp then queries the DNS server on the identifier of the secondary orchestrator 1 "serveur-orchestrator-1.orange.com" and obtains in return the IP address (139.100.1.1) of this secondary orchestrator.

Then, during step E33, the main orchestrator NFVOp transmits to the secondary orchestrator 1, an object instantiation request of which the descriptor has for identifier "nsd-123e4567-e89b-12d3-a456-426655440000" or a recovery request for the object descriptor "nsd-123e4567-e89b-12d3-a456-426655440000".

In the SRV record described hereinabove, the two values following the SRV (here 0 and 0) can usefully be valorised in order to set up a load sharing over several orchestration servers. The first field corresponds to a priority associated with a server and the second field to a weight that makes it possible to choose between servers with the same priority. By varying these values, the load between the servers can be balanced.

The IP addresses are returned in the additional DNS fields.

According to an alternative, different labels can be used to differentiate the types of target entities available. For example if the target domain contains target entities that are capable of providing a descriptor and other target entities capable of instantiating an object, the SRV records of the DNS server will be of the form

```
$ORIGIN orange.com.
_desc._nfv._tcp.orange.com. 3600 IN SRV 0 0 80 serveur-nfvdesc.orange.com.
_inst._nfv._tcp.orange.com. 3600 IN SRV 0 0 80 serveur-nfvinst.orange.com.
```

Thus, when the main orchestrator NFVOp queries the DNS server on the service NFV of the target domain (here orange.com), it will be able to specify in its query if it wants to obtain an identifier of a target entity capable of providing a descriptor or a target entity capable of instantiating an object, by using respectively the prefix _desc or _inst in its query request.

Figure 4B:
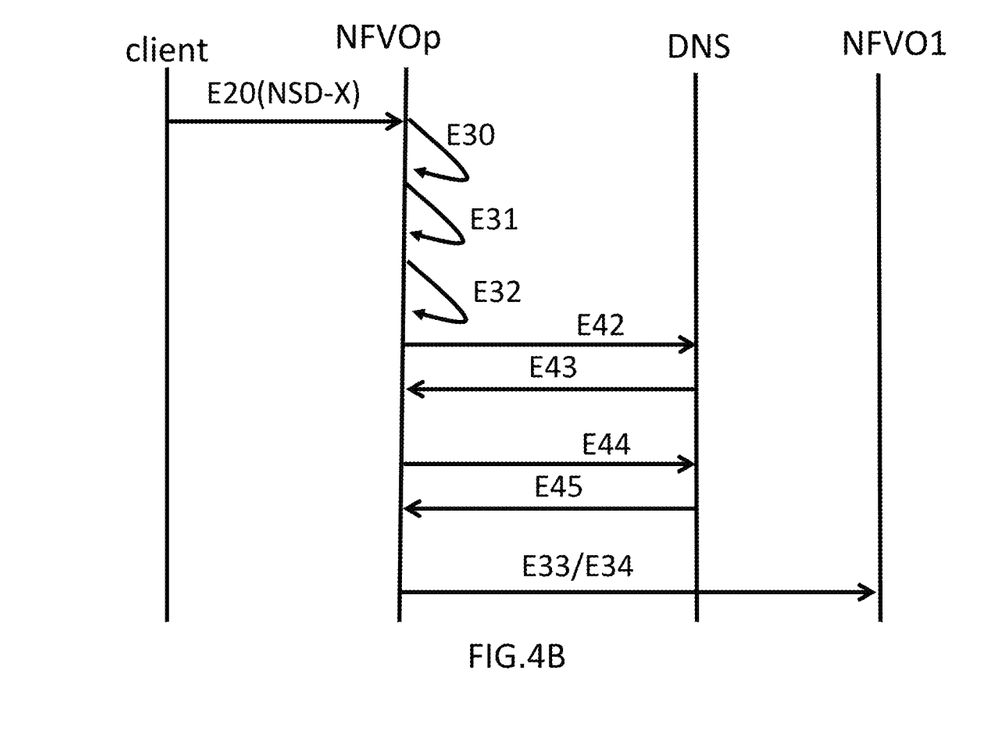

In relation with FIG. 4B another particular embodiment of the invention is now described wherein the functionalities of the discovery of service DNS-SD (DNS Service Discovery) such as defined in RFC 6763 are used.

The DNS-SD function makes it possible to discover orchestration services desired for the deployment of the requested network service.

The DNS server of the domain mentioned in the generalised identifier then comprises the following types of records:

PTR records in order to have a service type list corresponding with service instances, SRV records to associate these instantiations with ports and server names of the domain, optionally, TXT records (text) to enrich the description of the services rendered using a syntactically free description.

The general form of a PTR record for the DNS-SD functionality is as follows:

Service Instance Name=<Instance>. <Service>. <Domain>

<Service> is formed from two identifiers _xx: the first is the service identifier. For example, _nfv for the service NFV.

As for the first alternative, different service identifiers can be used if it is necessary to distinguish different types of available entities.

The second identifier is the protocol on which this service will be rendered. For example, _tcp, if it is assumed that the service NFV can be accessed with the HTTP protocol.

<Instance> is formed from the identifier of the NFV object descriptor concerned. By taking the example described hereinabove, the identifier nsd-123e4567-e89b-12d3-a456-426655440000 of the required object is displayed in the PTR record.

<Instance> is syntactically constrained only by its length and has to be unique only within the domain considered.

For example, the DNS server comprises the following PTR records:

```
$ORIGIN orange.com.
_nfv._tcp.orange.com. PTR nsd-123e4567-e89b-12d3-a456-426655440000_nfv_
tcp.serveur-orchestrator-1.orange.com.
_nfv._tcp.orange.com. PTR nsd-123e4567-e89b-12d3-a456-426655441111_nfv_
tcp.serveur-orchestrator-1.orange.com.
_nfv._tcp.orange.com. PTR nsd-123e4567-e89b-12d3-a456-426655441111_nfv_
tcp.serveur-orchestrator-2.orange.com.
_nfv._tcp.orange.com. PTR nsd-123e4567-e89b-12d3-a456-426655442222_nfv_
tcp.serveur-orchestrator-2.orange.com.
_nfv._tcp.orange.com. PTR nsd-123e4567-e89b-12d3-a456-426655443333_nfv_
tcp.serveur-orchestrator-2.orange.com.
```

The DNS server also comprises the following SRV and TXT records:

```
nsd-123e4567-e89b-12d3-a456-426655441111_nfv_tcp.serveur-orchestrator-
1.orange.com. SRV 0 0 80 serveur-orchestrator-1.orange.com.
nsd-123e4567-e89b-12d3-a456-426655441111_nfv_tcp.serveur-orchestrator-
2.orange.com. SRV 0 0 80 serveur-orchestrator-2.orange.com.
TXT path=/chemin-entree
serveur-orchestrator-1.orange.com.        A        139.100.1.2
serveur-orchestrator-2.orange.com.        A        139.100.20.30
```

In this particular embodiment of the invention, the main orchestrator NFVOp queries the DNS server of the domain mentioned in the generalised identifier (for example "orange.com"), on the service NFV, by using the identifier of the descriptor of the object required, for example nsd-123e4567-e89b-12d3-a456-426655441111.

During a step E42, the main orchestrator NFVOp requires the descriptor nsd-123e4567-e89b-12d3-a456-426655441111_nfv in the domain orange.com.

During an E43, according to the PTR records memorised in the DNS server, the DNS server then sends it the following two PTR records:

```
_nfv._tcp.orange.com. PTR nsd-123e4567-e89b-12d3-a456-
426655441111_nfv_tcp.serveur-orchestrator-1.orange.com.
_nfv._tcp.orange.com. PTR nsd-123e4567-e89b-12d3-a456-
426655441111_nfv_tcp.serveur-orchestrator-2.orange.com.
```

The main orchestrator NFVOp then selects one of the two servers proposed, for example the secondary orchestrator serveur-orchestrator-1.orange.com.

During a step E44, the main orchestrator NFVOp queries the DNS server on the resource nsd-123e4567-e89b-12d3-a456-426655441111_nfv_tcp.serveur-orchestrator-1.orange.com.

During a step E45, the DNS server then transmits to it the SRV and TXT records memorised for this resource.

The main orchestrator NFVOp then obtains the following records:

```
nsd-123e4567-e89b-12d3-a456-426655441111_nfv_tcp.serveur-orchestrator-
1.orange.com. SRV 0 0 80 serveur-orchestrator-1.orange.com.
TXT path=/chemin-entree
serveur-orchestrator-1.orange.com.        A        139.100.1.2
```

The main orchestrator NFVOp thus obtains the IP address of the secondary orchestrator serveur-orchestrator-1.orange.com.

According to an alternative, the TXT record "path=" memorised by the DNS server can be used to specify the path to be used in the URI HTTP to access the object concerned.

In an alternative embodiment, an additional TXT record can be valorised to indicate to the main orchestrator NFVOp the license or version requirements for each one of the VNF or NS packages received. For example, such a TXT record can be of the form TXT version=1.2.3.4.5.

In a manner similar to the particular embodiment described in relation with FIG. 4A, the PTR or SRV records according to the particular embodiment described here can include a label that indicates if the target entity is configured to instantiate said object of the network service or to transmit the descriptor of said object to the orchestration entity.

In a manner similar to the particular embodiments described hereinabove, during a step E33, the main orchestrator NFVOp sends an instantiation request or a recovery request to the target entity.

The embodiments described hereinabove apply in a similar manner when the object required by the requested network is a nested network service Nested NS. When the main orchestrator NFVOp recovers the Nested descriptor NSD of the nested network service, it may be the case that the Nested descriptor NSD recovered itself references objects that of which the main orchestrator NFVOp does not have.

According to an alternative, the target entity that provided the Nested descriptor NSD, for example a secondary orchestrator, also provides the main orchestrator NFVOp with the objects referenced in this Nested descriptor NSD.

When the secondary orchestrator does not have objects referenced in this Nested descriptor NSD, the secondary orchestrator then uses at least steps E31 and E33 described hereinabove according to any of the particular embodiments of the invention, so as to obtain for each unavailable object referenced a file comprising a descriptor of this object.

During a step E31, the secondary orchestrator obtains, from the nested network service descriptor, information making it possible to identify at least one target entity configured to transmit the descriptor of an unavailable object referenced in the nested network service descriptor, to the secondary orchestrator.

During a step E33, the secondary orchestrator transmits to one of said at least one target entity a recovery request for a file comprising a descriptor of the unavailable object and transmits this file to the main orchestrator NFVOp.

It is of course understood that the recovery mechanism of a file comprising a descriptor of the unavailable object can be used recursively, by the various target entities to which such a file is requested when this file comprises a descriptor of a nested network service and these target entities do not have objects referenced in such a descriptor.

According to another alternative, the main orchestrator NFVOp itself recovers the objects referenced in a nested network service descriptor and of which it does not have. For this, the main orchestrator NFVOp uses at least steps E31 and E33 described hereinabove according to any of the particular embodiments of the invention to obtain for each unavailable referenced object a file that comprises a descriptor of this object with the target entity.

Figure 5:
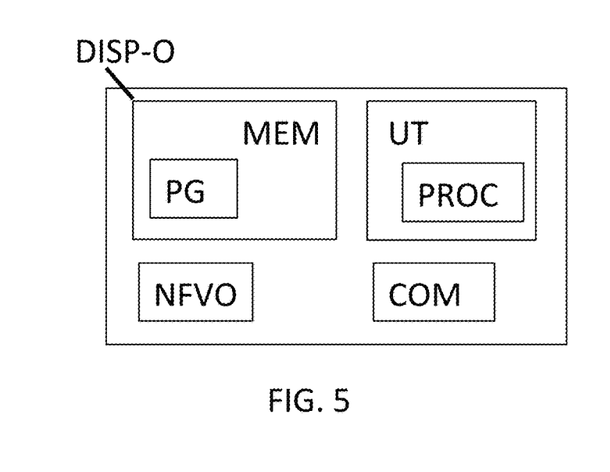
FIG. 5 shows a device configured to implement the method of processing of a network service instantiation request according to a particular embodiment of the invention.

FIG. 5 shows an orchestration device configured to use the method for processing a network service instantiation request according to any of the particular embodiments of the invention.

Such an orchestration device in particular comprises an orchestration entity (NFVO) configured to use all or a portion of a virtualised network functions service.

The orchestration device comprises a receiver (COM) of a network service instantiation request, and a memory (MEM) that memorises a descriptor of said network service, said descriptor of the network service comprising at least one reference to an object to be deployed in order to instantiate said network service, the orchestration device comprises a processing unit (UT) configured to:
when said descriptor of the object is not available at the orchestration entity (NFVO), obtain, from the network service descriptor, information that can be used to identify at least one target entity configured to instantiate said object on instruction from the orchestration entity (NFVO) or transmit the descriptor of said object to the orchestration entity (NFVO),
and transmit to one of said at least one target entity an instantiation request of said object or a request to recover the descriptor of said object.

According to a particular embodiment of the invention, the steps of the method for processing a network service instantiation request are implemented by instructions of a computer program PG.

The processing unit UT of the orchestration device is provided for example with a processor PROC, and controlled by the computer program PG stored in memory MEM. The computer program PG comprises instructions to implement the steps of the data processing method such as described hereinabove, when the program is executed by the processor PROC.

At initialisation, the code instructions of the computer program PG are for example loaded into a memory before being executed by the processor PROC. The processor PROC of the processing unit UT uses in particular the steps of the method for processing data according to any of the particular embodiments described in relation with FIG. 3, 4A or 4B according to the instructions of the computer program PG.

According to a particular embodiment of the invention, the orchestration device is comprised in a server.

Figure 6:
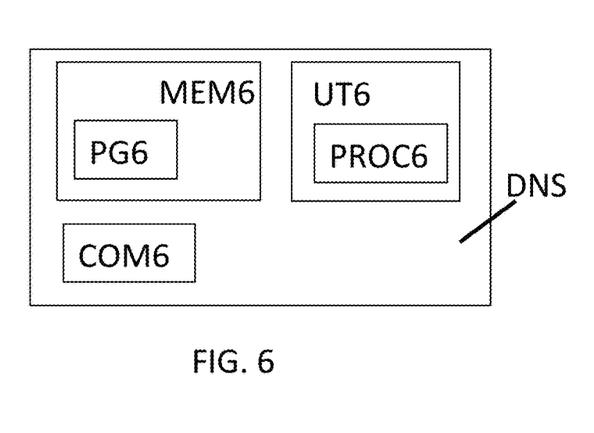
FIG. 6 shows a DNS (Domain Name System) server configured to implement the method for processing a network service instantiation request according to particular embodiments of the invention.

FIG. 6 shows a DNS server configured to use steps of the method for processing a network service instantiation request according to any of the particular embodiments of the invention described in relation with FIG. 4A or 4B.

The DNS server comprises a memory MEM6, a processing unit UT6, provided for example with a processor PROC6, and controlled by the computer program PG6 stored in memory MEM6. The computer program PG6 comprises instructions to use steps of the method for processing data such as described hereinabove, when the program is executed by the processor PROC6. The DNS server also comprises an emitter/receiver COM6 configured to receive query requests and send SRV, PTR and/or TXT records.

At initialisation, the code instructions of the computer program PG6 are for example loaded into a memory before being executed by the processor PROC6.

The memory of the DNS server in particular comprises at least one record associating an identifier of a virtualised networks functions domain with at least one target entity of the virtualised networks functions domain, said target entity being configured to instantiate an object of a network service on instruction from an orchestration entity or transmit a descriptor of said object to the orchestration entity.

According to a particular embodiment of the invention, the record or records of the DNS server to use steps of the method for processing a network service instantiation request are of the SRV or PTR type.

According to another particular embodiment of the invention, the record or records of the DNS server to use steps of the method for processing a network service instantiation request further comprise a label indicating if said target entity is configured to instantiate said object of the network service or to transmit the descriptor of said object to the orchestration entity.

The invention claimed is:

1. A method for processing a network service instantiation request, a network service descriptor comprising at least one reference to an object to be deployed in order to instantiate said network service, the method for processing, used by an orchestration entity using all or a portion of a virtualized network functions service, comprising:
determining that a descriptor of the object is not stored in a memory of said orchestration entity,
in response to the determination that the descriptor of the object is not stored in the memory of the orchestration entity, sending a query to a name resolution server of a virtualized networks functions domain on the virtualized network functions service, said virtualized networks functions domain being a domain identified in the network service descriptor, to obtain information that can be used to identify at least one target entity, the query comprising a prefix specifying that the target entity is either:

an instantiation target entity configured to instantiate said object on instruction from the orchestration entity, or
a descriptor target entity configured to transmit the descriptor of the object to the orchestration entity,
obtaining from the network service descriptor said information comprising at least an identifier of the descriptor of the object, and
transmitting, by the orchestration entity, to the target entity a request, that either:
in a first case in which the prefix specifies that the target entity is an instantiation target entity, comprises the identifier of the descriptor of the object and requests to instantiate said object, or
in a second case in which the prefix specifies that the target entity is a descriptor target entity, requests to recover a file comprising the descriptor of the object, wherein the descriptor target entity is incapable of instantiating the network service.

2. The method according to claim 1, wherein said information comprises an identifier of the target entity on which the descriptor of the object is stored.

3. The method according to claim 1, wherein said information comprises an identifier of the virtualized networks functions domain on which the target entity is located.

4. An orchestration device configured to use all or a portion of a virtualized network functions service by an orchestration entity, the device comprising:
a receiver of a network service instantiation request;
a non-transitory computer-readable memory memorizing a network service descriptor, said network service descriptor comprising at least one reference to an object to be deployed in order to instantiate said network service; and
a processing unit configured to:
determine that a descriptor of the object is not stored in the non-transitory computer-readable memory of said orchestration entity,
in response to the determination that said descriptor of the object is not stored in the non-transitory computer-readable memory of the orchestration entity, send a query to a name resolution server of a virtualized networks functions domain on the virtualized networks functions service, said virtualized networks functions domain being a domain identified in the network service descriptor, to obtain information that can be used to identify at least one target entity, the query comprising a prefix specifying that the target entity is either:
an instantiation target entity configured to instantiate said object on instruction from the orchestration entity, or
a descriptor target entity configured to transmit the descriptor of the object to the orchestration entity,
obtain from the network service descriptor said information comprising at least an identifier of the descriptor of the object, and
transmit to the target entity a request, that either:
in a first case in which the prefix specifies that the target entity is an instantiation target entity, comprises the identifier of the descriptor of the object and requests an instantiation of said object, or
in a second case in which the prefix specifies that the target entity is a descriptor target entity, requests to recover the descriptor of the object, wherein the descriptor target entity is incapable of instantiating the network service.

5. A name resolution server, comprising:
a non-transitory computer-readable memory that memorizes at least one record associating an identifier of a virtualized networks functions domain with at least one target entity of the virtualized networks functions domain, the target entity being either:
an instantiation target entity configured to instantiate an object of a network service on instruction from an orchestration entity, or
a descriptor target entity configured to transmit a descriptor of the object to the orchestration entity; and
a processor and an emitter/receiver configured to:
receive, from the orchestration entity at which the descriptor of the object is not available and for which the object has not yet been instantiated, a query comprising a prefix specifying whether the target entity is an instantiation target entity or a descriptor target entity, and
in response send said at least one record associating the identifier of the virtualized networks functions domain with the target entity of the virtualized networks functions domain that either:
in a first case in which the prefix specifies that the target entity is an instantiation target entity, is configured to instantiate the object, or
in a second case in which the prefix specifies that the target entity is a descriptor target entity, is configured to transmit the descriptor of the object to the orchestration entity, wherein the descriptor target entity is incapable of instantiating the network service; and
transmit to the target entity a request, that either:
in the first case, comprises an identifier of the descriptor of the object and requests an instantiation of said object, or
in the second case, requests to recover the descriptor of the object.

6. The name resolution server according to claim 5, wherein said at least one record is a Service resource records (SRV) or Pointer records (PTR) type.

7. A non-transitory computer-readable medium comprising a computer program stored thereon including instructions for implementing a method for processing a network service instantiation request, when said program is executed by a processor of an orchestration entity using all or a portion of a virtualized network functions service, a network service descriptor comprising at least one reference to an object to be deployed in order to instantiate said network service, wherein the instructions configure the orchestration entity to:
determine that a descriptor of the object is not stored in a memory of said orchestration entity,
in response to the determination that the descriptor of the object is not stored in the memory of the orchestration entity, send a query to a name resolution server of a virtualized networks functions domain on the virtualized network functions service, said virtualized networks functions domain being a domain identified in the network service descriptor, to obtain information that can be used to identify at least one target entity, the query comprising a prefix specifying that the target entity is either:
an instantiation target entity configured to instantiate said object on instruction from the orchestration entity, or a descriptor target entity configured to transmit the descriptor of the object to the orchestration entity, obtain from the network service descriptor said information comprising at least an identifier of the descriptor of the object, and transmit, by the orchestration entity, to the target entity a request, that either:
- in a first case in which the prefix specifies that the target entity is an instantiation target entity, comprises the identifier of the descriptor of the object and requests to instantiate said object, or
- in a second case in which the prefix specifies that the target entity is a descriptor target entity, requests to recover a file comprising the descriptor of the object, wherein the descriptor target entity is incapable of instantiating the network service.

* * * * *